(12) United States Patent
Li et al.

(10) Patent No.: US 11,952,759 B2
(45) Date of Patent: Apr. 9, 2024

(54) SWITCHING DEVICE FOR SHOWER SYSTEM AND SHOWER SYSTEM INCLUDING SAME

(71) Applicant: XIAMEN DELMEI SANITARY WARE CO., LTD., Xiamen (CN)

(72) Inventors: Wenjun Li, Nanping (CN); Weilong Luo, Quanzhou (CN); Chunhua Wang, Xiamen (CN)

(73) Assignee: XIAMEN DELMEI SANITARY WARE CO., LTD., Xiamen (CN)

( * ) Notice: Subject to any disclaimer, the term of this patent is extended or adjusted under 35 U.S.C. 154(b) by 323 days.

(21) Appl. No.: 17/406,107

(22) Filed: Aug. 19, 2021

(65) Prior Publication Data

US 2023/0030219 A1 Feb. 2, 2023

(30) Foreign Application Priority Data

Jul. 31, 2021 (CN) .......................... 202121776432.3

(51) Int. Cl.
*E03C 1/04* (2006.01)
*E03C 1/02* (2006.01)

(52) U.S. Cl.
CPC ...... *E03C 1/0408* (2013.01); *E03C 2001/026* (2013.01)

(58) Field of Classification Search
CPC ............ E03C 1/0408; E03C 2001/026; E03C 2201/30; F16K 11/0743
See application file for complete search history.

(56) References Cited

U.S. PATENT DOCUMENTS

| 4,095,610 A | * | 6/1978 | Priesmeyer | F16K 11/0746 137/119.03 |
| 10,232,386 B1 | * | 3/2019 | Lu | F16K 11/0743 |
| 2012/0151669 A1 | * | 6/2012 | Wilson | E03C 1/025 4/615 |

FOREIGN PATENT DOCUMENTS

CN          107524830 A    * 12/2017

* cited by examiner

*Primary Examiner* — Qingzhang Zhou (57) ABSTRACT

The present disclosure provides a switching device for shower system and a shower system including same. The switching device for shower system includes a shell main body, a valve, a handle kit, and a sealing cover. The shell main body is internally provided with a partition, the partition is provided with a plurality of water passing holes, and a side of the partition is provided with a plurality of water chambers. The valve is located inside the shell main body, and a first end of the valve abuts on a side of the partition and communicates with the water passing holes. The handle kit is connected to a second end of the valve. The sealing cover is configured to block the water chambers at an outer end.

6 Claims, 12 Drawing Sheets

SWITCHING DEVICE FOR SHOWER SYSTEM AND SHOWER SYSTEM INCLUDING SAME

CROSS-REFERENCE TO RELATED APPLICATIONS

This application is based upon and claims priority to Chinese Patent Application No. 202121776432.3, filed on Jul. 31, 2021, the entire content of which is incorporated herein by reference.

TECHNICAL FIELD

The present disclosure relates to the field of sanitary ware, in particular to a switching device for shower system and shower system including same.

BACKGROUND

A shower system generally includes an overhead shower located in an upper position and a hand shower located in a lower position. Usually, the overhead shower is fixed and the spray pattern falls downward over a user's head. While, the hand shower can be held by the user and is movable, which is convenient to use. A switching device is arranged between the hand shower and the overhead shower to switch between the water passages of the hand shower and the overhead shower.

Currently, most of the switching devices mounted at the lower end of the shower tube are made of metal material, which is costly. In order to reduce production costs, the housing and internal structure of the switching device maybe made of plastic materials. However, the replacement of material will introduce a complicated structure and difficulties in production and assembling.

SUMMARY

The present disclosure provides a switching device for shower system and a shower system including same, which can effectively solve the above-mentioned problems.

The technical solution of the present disclosure is described below.

A switching device for shower system includes:
- a shell main body, wherein the shell main body is internally provided with a partition, the partition is provided with a plurality of water passing holes, and a side of the partition is provided with a plurality of water chambers;
- a valve, wherein the valve is located inside the shell main body, and a first end of the valve abuts on a side of the partition and communicates with the water passing holes;
- a handle kit, wherein the handle kit is connected to a second end of the valve; and
- a sealing cover, wherein the sealing cover is configured to block the water chambers at an outer end.

As a further improvement, an upper end of the shell main body is provided with a first connector, a lower end of the shell main body is provided with a second connector, the first connector is provided with a first water inlet port and a first water outlet port.

As a further improvement, the water passing holes include a first water passing hole, a second water passing hole, and a third water passing hole. The first water passing hole is connected to the first water inlet port, the second water passing hole is connected to the first water outlet port, and the third water passing hole is connected to the second connector.

As a further improvement, the water chambers include a first chamber, a second chamber, and a third chamber. The first chamber is connected to the first water passing hole, the second chamber is connected to the second water passing hole, and the third chamber is connected to the third water passing hole.

As a further improvement, the sealing cover is provided with a plurality of protrusions, and the protrusions are received in the water chambers.

As a further improvement, the sealing cover is welded to the outer end of the water chambers.

As a further improvement, switching device further includes a fixing kit, the shell main body is internally provided with a plurality of mounting bases, and the fixing kit is mounted on the mounting bases.

According to another aspect, the present disclosure provides a shower system, which includes a discharge tube, a hand shower, an overhead shower, and the switching device for shower system described above. The discharge tube includes a first shower tube and a second shower tube. The second shower tube includes an inner tube and an outer tube. The inner tube is connected to the first water inlet port, and the outer tube is connected to the first water outlet port.

As a further improvement, an adapter is connected between the first shower tube and the second shower tube. The adapter includes an adapter shell, a first inner tube, a second inner tube, and a third inner tube. The first inner tube and the second inner tube are received inside the adapter shell. A first end of the third inner tube is inserted in the first inner tube, and a second end of the third inner tube is inserted in the second inner tube.

The present disclosure has the following advantages.

First, the switching device for shower system of the present disclosure includes a shell main body, a valve, a handle kit, a sealing cover, and a fixing kit. The shell main body is internally provided with a partition, the partition is provided with a plurality of water passing holes, and a side of the partition is provided with a plurality of water chambers communicating with the water passing holes. The sealing cover is welded on an outer end surface of the water chambers. The sealing cover, partition, and water chambers jointly achieve the switching of the water passages inside the shell main body. Such structure is simple and easy to implement. Meanwhile, the shell main body and the sealing cover are both made of plastic materials, so the structure of the present disclosure is cost-effective and convenient in welding.

Second, a front end of the switching device for shower system of the present disclosure is provided with a handle kit. The handle kit includes a nut, a handle fixing base, and a handle. The valve is controlled by rotating the handle kit, so as to switch the water passages in the switching device and supply water for the hand shower or overhead shower, respectively. The handle kit in the present disclosure is simple in structure and convenient to install. The handle roughly has a quadrangular structure with round edges, which is convenient for the user to grip, and has a simple and elegant appearance.

Third, the second shower tube of the present disclosure has two layers, and the second shower tube is connected to the first shower tube through an adapter. The adapter is internally provided with a first inner tube, a second inner tube, and a third inner tube. Two ends of the third inner tube are respectively inserted into the first inner tube and the second inner tube. The third inner tube allows the external water source to flow through the inner shower tube to supply water for the hand shower. The second inner tube is connected to the outer shower tube, and the water flows through the second inner tube and third inner tube to spray out from the overhead shower after being switched by the switching device. The adapter of the present disclosure can clearly define the water passages of the hand shower or overhead shower with a compact internal structure and convenient assembling.

BRIEF DESCRIPTION OF THE DRAWINGS

In order to clearly explain the embodiments of the present disclosure, the drawings that would be used in describing the embodiments will briefly introduced below. It should be understood that the drawings illustrated below merely includes some of the embodiments of the present disclosure and should not be considered as limiting the scope of the present disclosure. For those of ordinary skill in the art, other drawings may be derived based on these drawings without creative effort.

The reference numerals in the drawings are listed below.
1. shell main body;
11. partition;
12. water passing hole; 121. first water passing hole; 122. second water passing hole; 123. third water passing hole;
13. water chamber; 131. first chamber; 132. second chamber; 133. third chamber;
14. first connector; 141. first water inlet port; 142. first water outlet port;
15. second connector;
16. mounting base;
2. valve;
3. handle kit;
31. nut; 32. handle fixing base; 33. handle;
4. sealing cover; 41. protrusion;
411. first protrusion; 412. second protrusion; 413. third protrusion;
42. protrusion rib;
5. fixing kit;
6. discharge tube;
61. first shower tube;
62. second shower tube; 621. inner tube; 622. outer tube;
7. hand shower;
8. overhead shower;
9. adapter;
91. adapter shell; 92. first inner tube; 93. second inner tube;
94. third inner tube; 941. engaging element.

DETAILED DESCRIPTION OF THE EMBODIMENTS

In order to make the objectives, technical solutions, and advantages of the embodiments of the present disclosure clearer, the technical solutions of the embodiments of the present disclosure will be described clearly and completely below with reference to the drawings of the embodiments of the present disclosure. Obviously, the described embodiments are parts of, but not all of, the embodiments of the present disclosure. Based on the embodiments of the present disclosure, all other embodiments derived by those of ordinary skills in the art without creative effort fall within the scope of protection of the present disclosure. Accordingly, the following detailed description of the embodiments of the present disclosure shown in the drawings is not intended to limit the scope of protection of the present disclosure, but merely to represent selected embodiments of the present disclosure.

In the description of the present disclosure, the terms "first", "second" are used only for descriptive purposes and cannot be understood as indicating or implying relative importance or implying the number of indicated technical features. Thus, a characteristic that is referred to by "first" and "second" may include, expressly or implicitly, one or more of the characteristics. Also, it should be noted that the terms of "up", "down", "inside/inner", "outside/outer", "front end", "rear end", "two ends", "one end", "another end", "one side", "another side" for indicating the location or orientation are based on the location or orientation shown in the drawings for the sake of simplifying the description of the present disclosure, rather than indicate or imply that the indicated device or component must have specific location or orientation, or be constructed and operated by specific orientation. These terms should not be understood as limits to the present disclosure.

Figure 1:
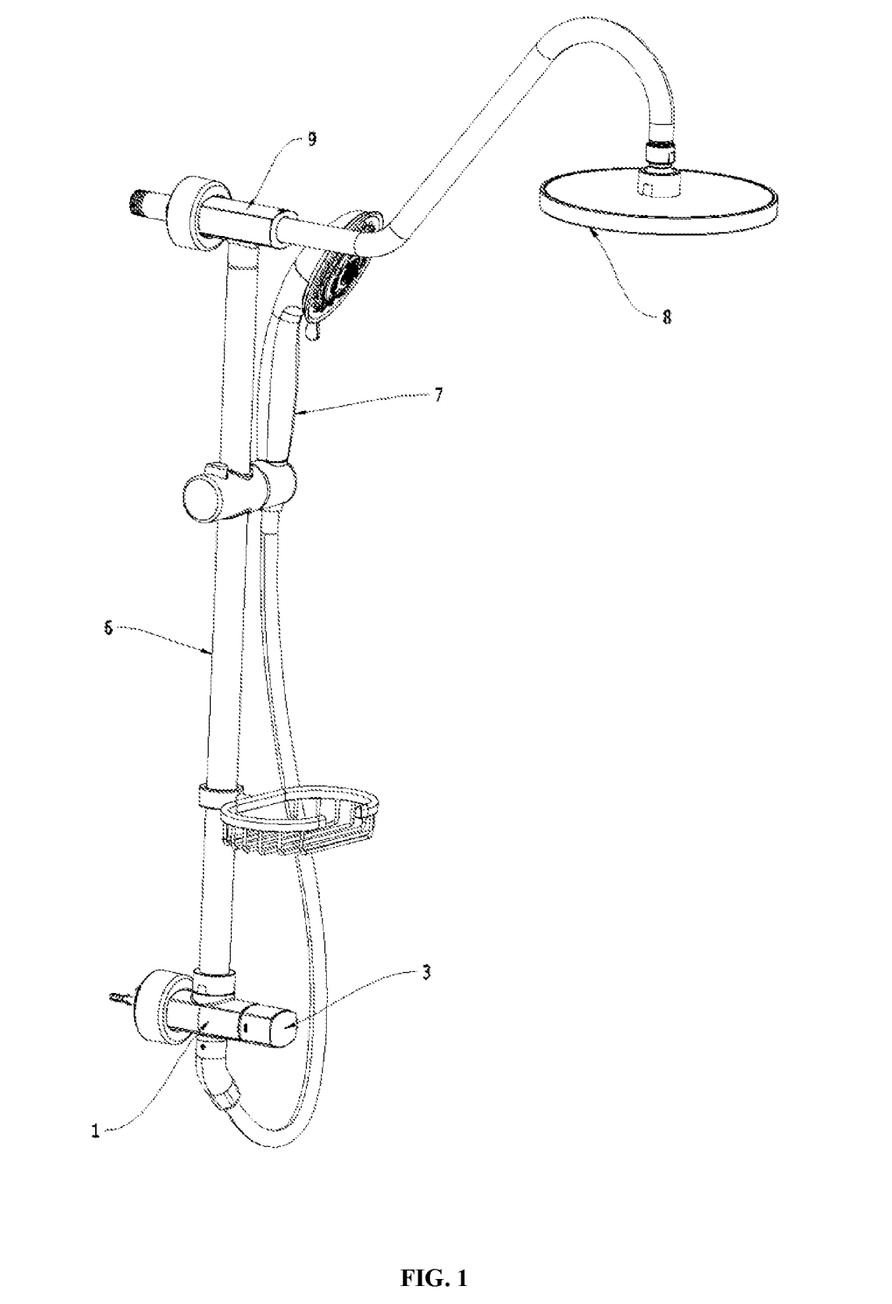
FIG. 1 is a structural schematic diagram of a shower system according to an embodiment of the present disclosure.
Figure 2:
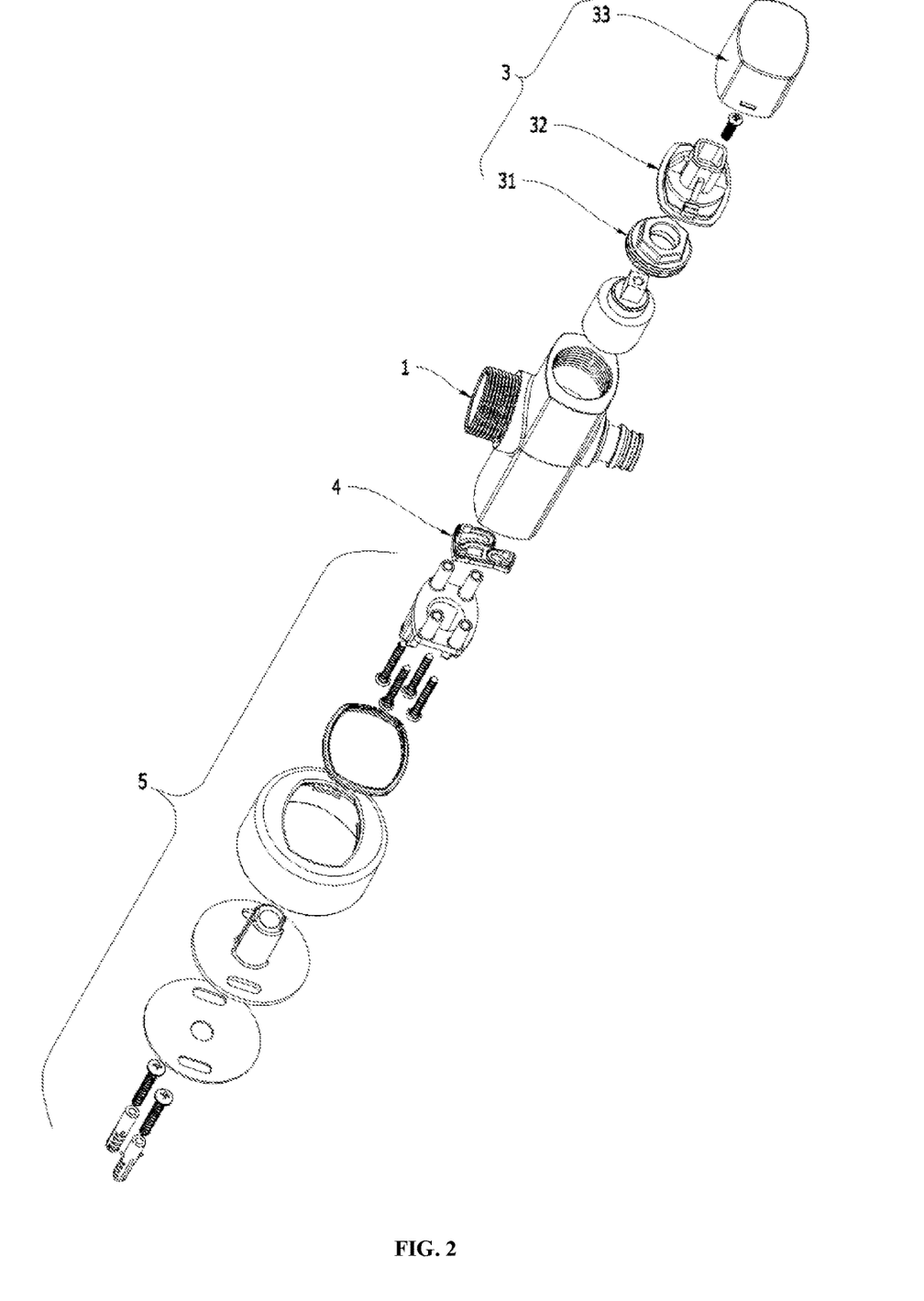
FIG. 2 is an exploded view of a switching device for the shower system according to an embodiment of the present disclosure.

As shown in FIG. 1 and FIG. 2, an embodiment of the present disclosure provides a shower system including a switching device, a discharge tube 6, a hand shower 7, an overhead shower 8, and an adapter 9 connected to the discharge tube 6. The switching device includes a shell main body 1, a valve 2, a handle kit 3, a sealing cover 4, and a fixing kit 5. The switching device is controlled to supply water for the hand shower 7 or the overhead shower 8. In the present embodiment, the shell main body 1 and the sealing cover 4 of the switching device are made of plastic materials, preferably, ABS engineering plastics, which may effectively save the cost. In the present embodiment, preferably, the sealing cover 4 and the shell main body 1 are ultrasonically welded, so the installation is easier and more stable. The sealing cover 4 and the shell main body 1 are made of plastic materials instead of metal materials used in the conventional switching device, and the sealing cover 4 and the shell main body 1 of the present disclosure has a simple structure and lowered cost.

Figure 3:
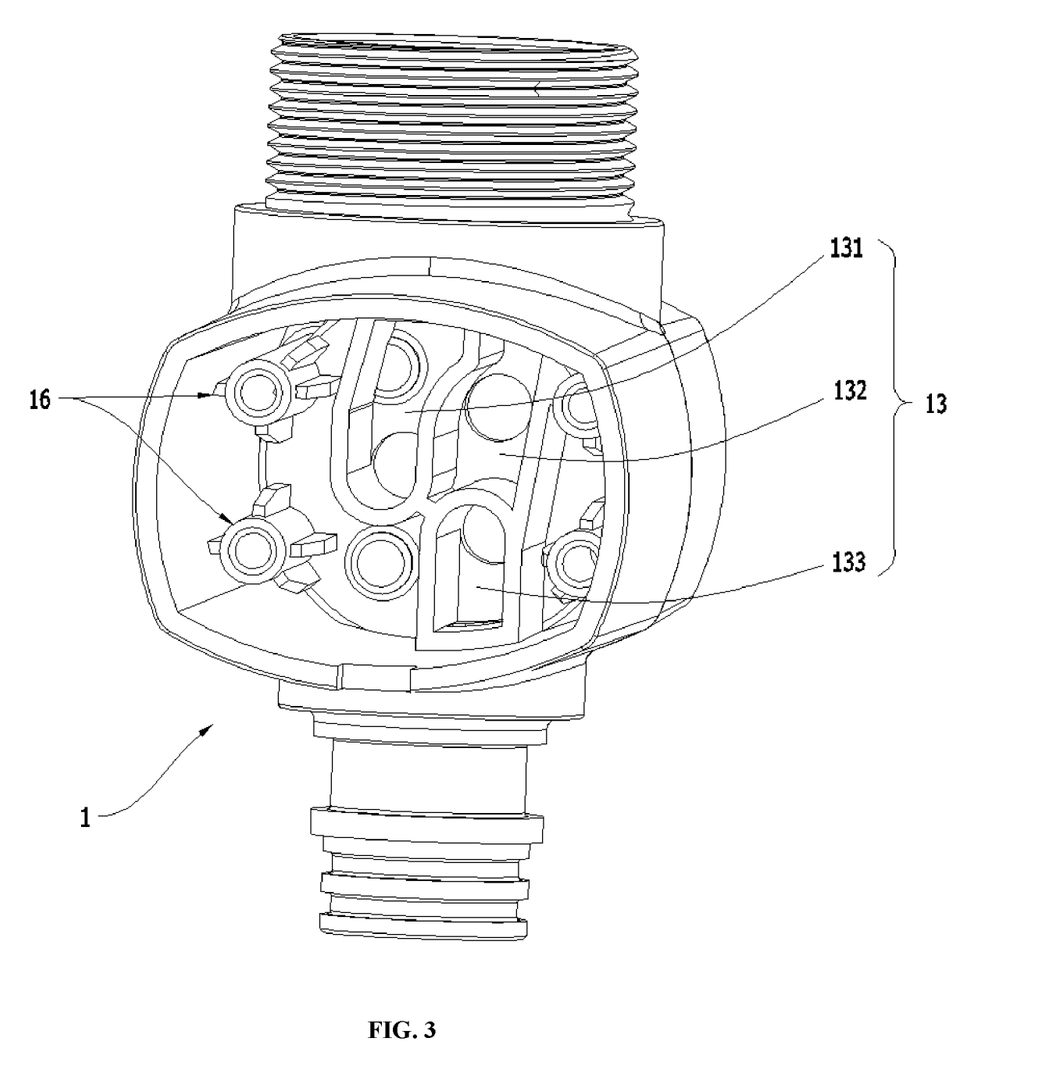
FIG. 3 is a schematic diagram showing an internal structure of a shell main body of the switching device for the shower system from a first perspective according to an embodiment of the present disclosure.
Figure 4:
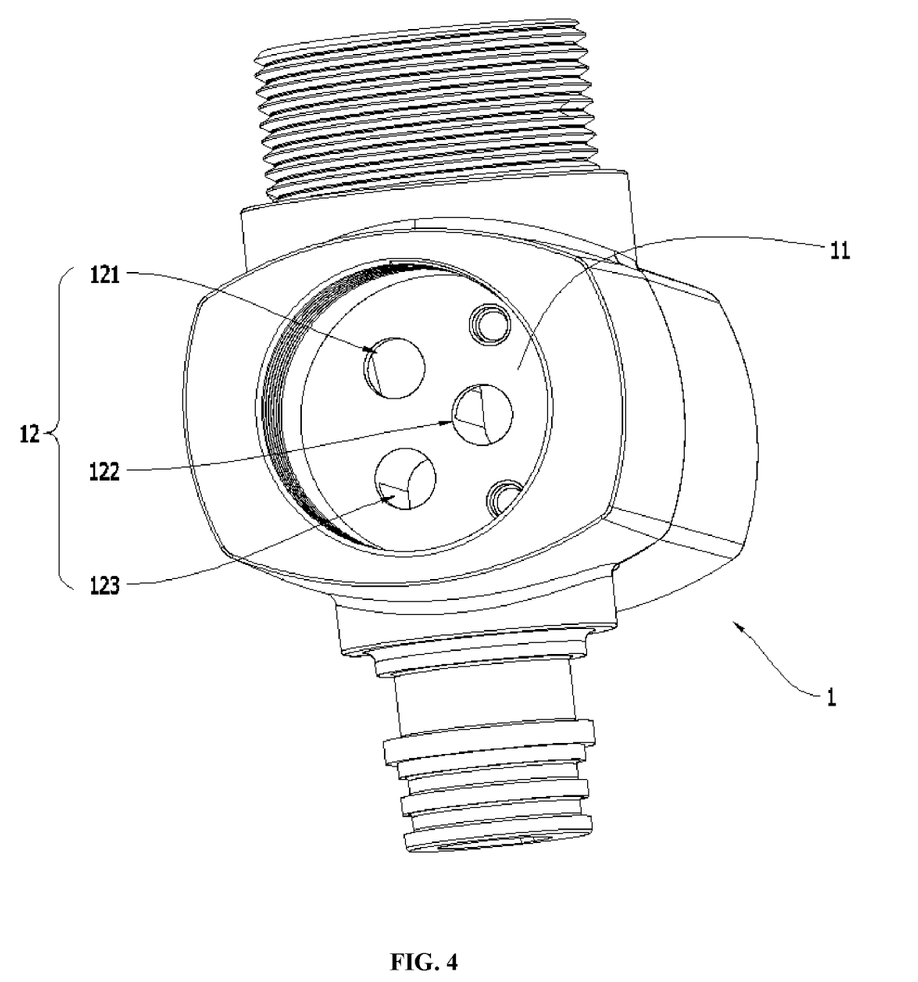
FIG. 4 is a schematic diagram showing an internal structure of the shell main body of the switching device for the shower system from a second perspective according to an embodiment of the present disclosure.

Further, as shown in FIG. 3 and FIG. 4, in the present embodiment, the shell main body 1 is internally provided with a partition 11, and the partition 11 is provided with a plurality of water passing holes 12. A side of the partition 11 is provided with a plurality of water chambers 13, and the water chambers 13 are located at the side away from the valve 2. The mutually independent water chambers 13 lie adjacent to one another but do not communicate with each other, and such compact structure may reduce space usage inside the shell main body 1. Preferably, three water passing holes 12 and three water chambers 13 are respectively provided. The water passing holes 12 include a first water passing hole 121, a second water passing hole 122, and a third water passing hole 123. The water chambers 13 include a first chamber 131, a second chamber 132, and a third chamber 133. The first water passing hole 121 communicates with the first water chamber 131, the second water passing hole 122 communicates with the second water chamber 132, and the third water passing hole 123 communicates with the third water chamber 133.

Furthermore, in the present embodiment, the valve 2 is located inside the shell main body 1, and a first end of the valve 2 abuts against a side surface of the partition 11. The front end surface of the valve 2 is provided with a sealing ring matched with the first water passing hole 121, the second water passing hole 122, and the third water passing hole 123. The sealing ring is used to block the first water passing hole 121, the second water passing hole 122, and the third water passing hole 123. The valve 2 is internally provided with different water passages which respectively communicates with the first water passing hole 121, the second water passing hole 122, and the third water passing hole 123.

Figure 5:
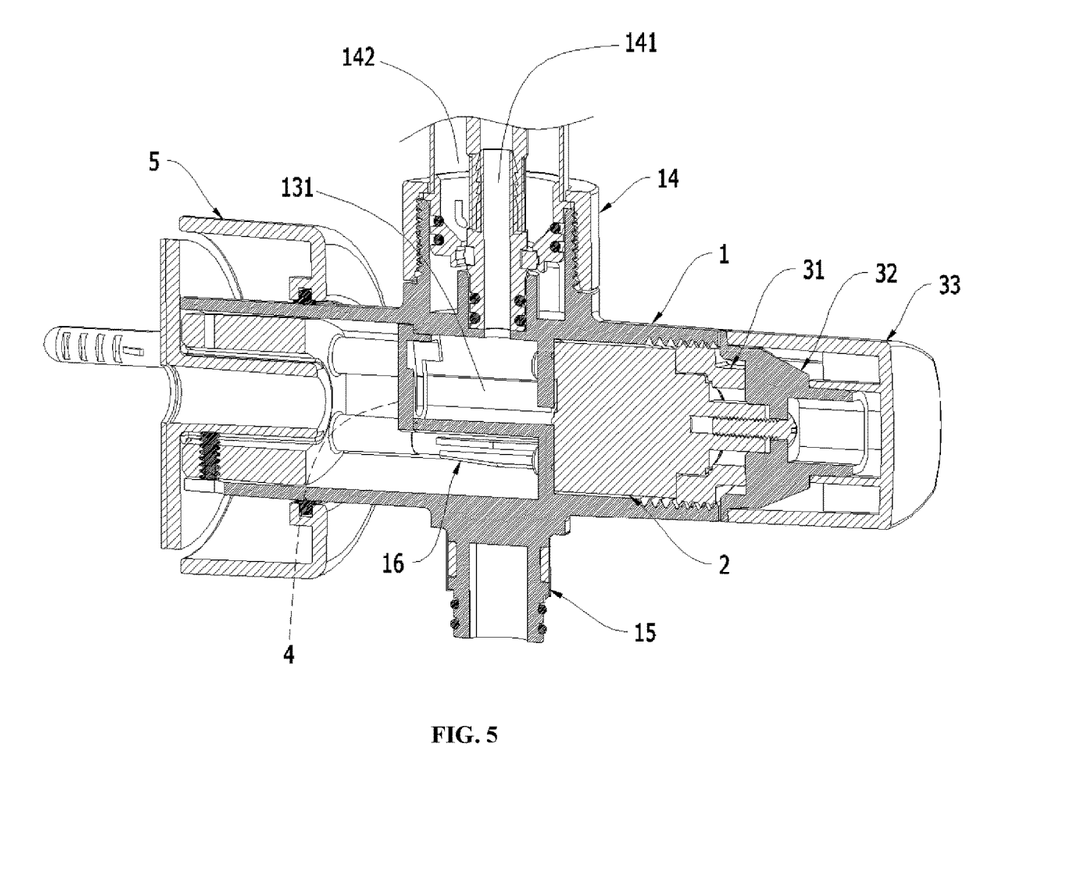
FIG. 5 is a sectional view of the switching device for the shower system according to an embodiment of the present disclosure.

Further, the handle kit 3 is connected to a second end of the valve 2. As shown in FIG. 5, the handle kit 3 in the present embodiment includes a nut 31, a handle fixing base 32, and a handle 33. In the present embodiment, the nut 31 is connected to the front end of the shell main body 1 through threads on the outer surface of the nut 31, and the second end of the valve 2 passes through an opening of the nut 31 to be engaged with the handle fixing base 32. After the nut 31 is screwed into the shell main body 1 to a preset position, the valve 2 is clamped between the nut 31 and the partition 11 to be fixed inside the shell main body 1. The end portion of the valve 2 passes through the opening of the nut 31 to be engaged with the handle fixing base 32, and is connected with the handle fixing base 32 by bolts. Afterward, the handle 33 is mounted on an outer side of the handle fixing base 32. When in use, a rotation of the handle kit 3 will cause a rotation of the internal structure of the valve 2 (not shown in the figure), so as to realize the switching of different water passages.

Figure 6:
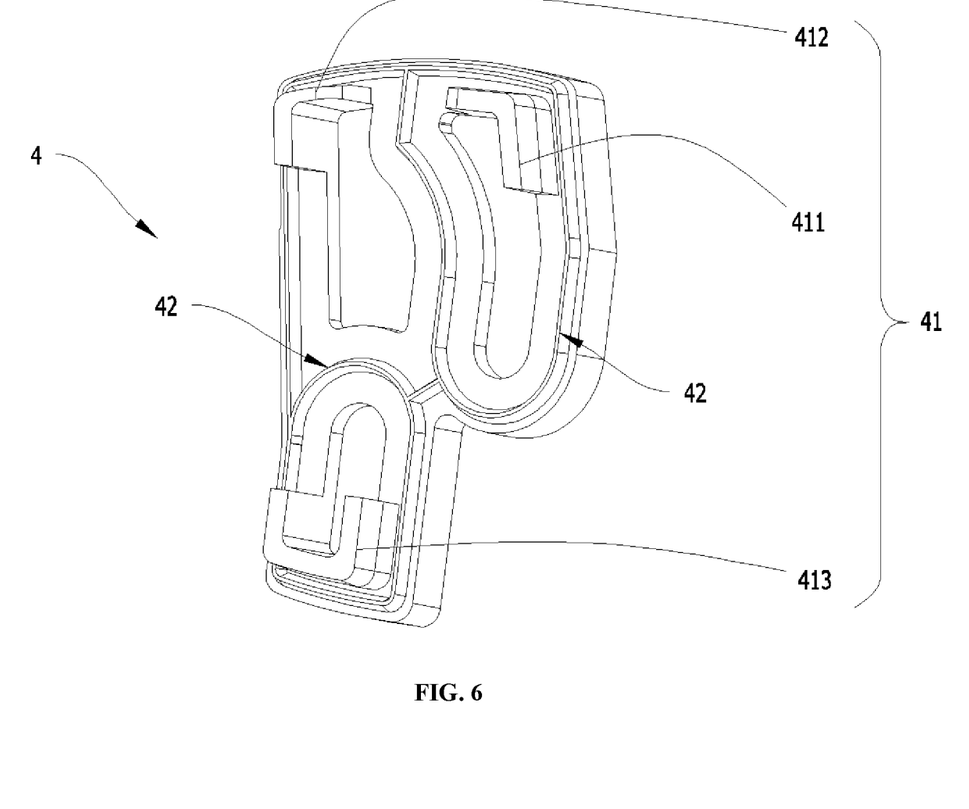
FIG. 6 is a structural schematic diagram of a sealing cover of the switching device for the shower system according to an embodiment of the present disclosure.

Further, the sealing cover 4 in the present embodiment blocks the outer end surface of the water chambers 13. The sealing cover 4 in the present embodiment is made of plastic material, preferably, ABS engineering plastic. The sealing cover 4 is welded to the outer end surface of the water chambers 13 in the shell main body 1, preferably by ultrasonic welding. Specifically, as shown in FIG. 6, the sealing cover 4 is provided with a plurality of protrusions 41 which are inserted into the water chambers 13. Specifically, the protrusions 41 include a first protrusion 411, a second protrusion 412, and a third protrusion 413, respectively. The first protrusion 411, the second protrusion 412, and the third protrusion 413 are respectively inserted into the first chamber 131, the second chamber 132, and the third chamber 133, and are fitted with the inner walls of the first chamber 131, the second chamber 132, and the third chamber 133. In the present embodiment, the first protrusion 411 and the second protrusion 412 are L-shaped and symmetrically arranged. The first protrusion 411 and the second protrusion 412 are respectively located in the up left corner and the up right corner of the sealing cover 4. The third protrusion 43 is U-shaped and is located at the lowermost end of the sealing cover 4. The first protrusion 411, the second protrusion 412, and the third protrusion 413 form an approximate triangular structure, which allows the sealing cover 4 to be firmly engaged with the water chambers 13, facilitating subsequent welding, packaging, and sealing. In addition, since the water chambers 13 have a high water pressure, configuring the protrusions 41 for connection may enhance the connection stability of the sealing cover 4 and avoid water leakage and detachment of the sealing cover 4 under the impact of water pressure. Meanwhile, the surface of the sealing cover 4 is provided with a protrusion rib 42, and the protrusion rib 42 abuts against the outer end surface of water chambers 13. During assembling, the sealing cover 4 is fixed on the water chambers 13 through the protrusions 41, and the protrusion rib 42 is positioned in the outer end surface of water chambers 13 to facilitate subsequent welding and packaging.

Figure 7:
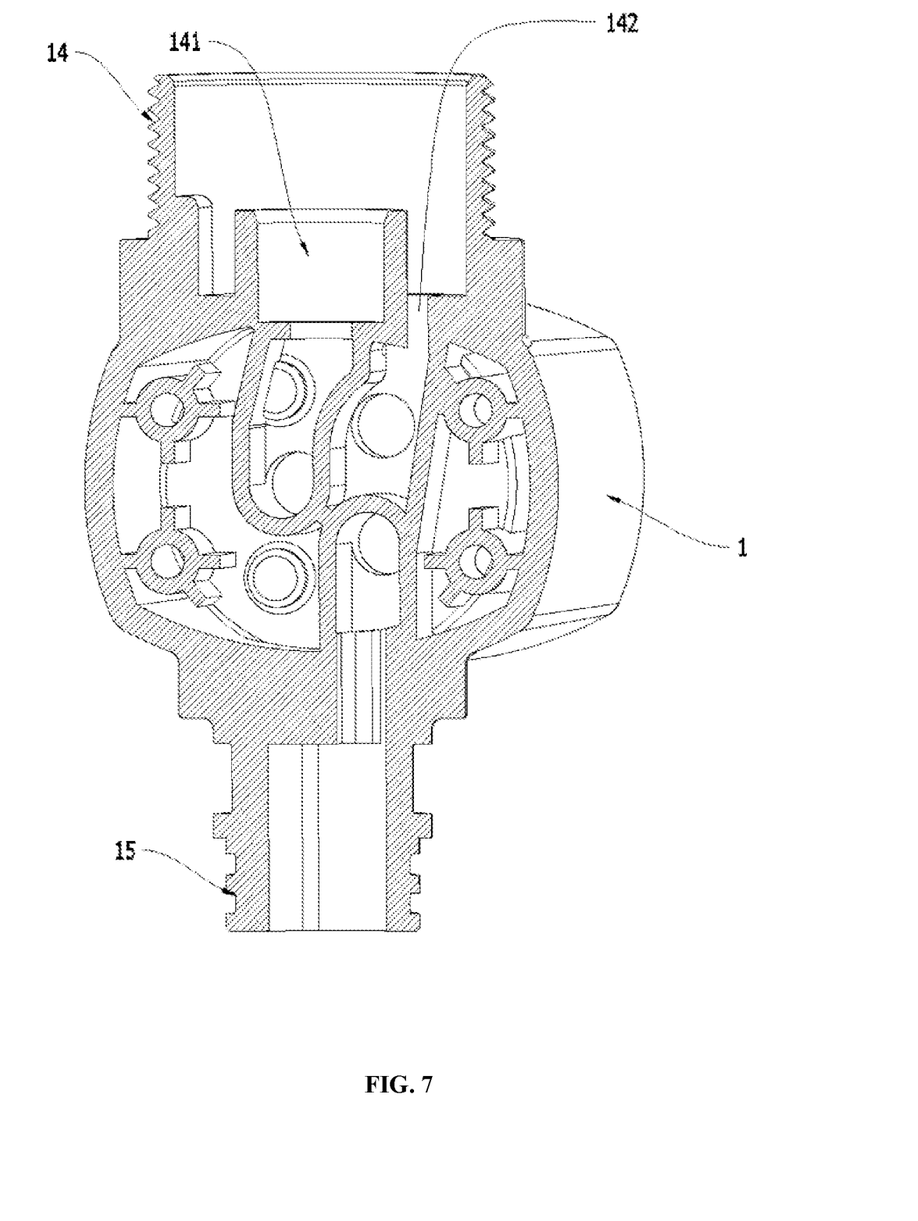
FIG. 7 is a sectional view of the shell main body of the switching device for the shower system according to an embodiment of the present disclosure.

Further, as shown in FIG. 7, in the present embodiment, an upper end of the shell main body 1 is provided with a first connector 14, and a lower end of the shell main body 1 is provided with a second connector 15. The first connector 14 is provided with a first water inlet port 141 and a first water outlet port 142. Specifically, the first water passing hole 121 is connected to the first water inlet port 141. The second water passing hole 122 is connected to the first water outlet port 142. The third water passing hole 123 is connected to the second connector 15. Water inflows from the first water inlet port 141 to enter the first chamber 131, then the water flows into the valve 2 from the first water passing hole 121. Subsequently, the water flows through the second water passing hole 122 from the valve 2 and enters the second chamber 132. Afterward, the water flows from the second chamber 132 to the first water outlet port 142 then to the overhead shower 8. The water passage is switched by rotating the handle kit 3. By doing so, the water flows from the first water passing hole 121 into the valve 2 then to the third water passing hole 123. Subsequently, water flows into the third chamber 133 then to the second connector 15. Afterward, the water flows into the hand shower 7 from the second connector 15.

Further, as shown in FIGS. 2 and 3, the switching device in the present embodiment further includes a fixing kit 5. Meanwhile, the inner wall of the shell main body 1 is provided with a plurality of mounting bases 16, and one end of the fixing kit 5 is installed in the mounting bases 16. The mounting base 16 may be a self-tapping screw mounting hole, and the fixing kit 5 is mounted on the mounting base 16 by a self-tapping screw. Also, the other end of the fixing kit 5 is also installed on the wall with self-tapping screws, which is convenient and simple to install.

Figure 8:
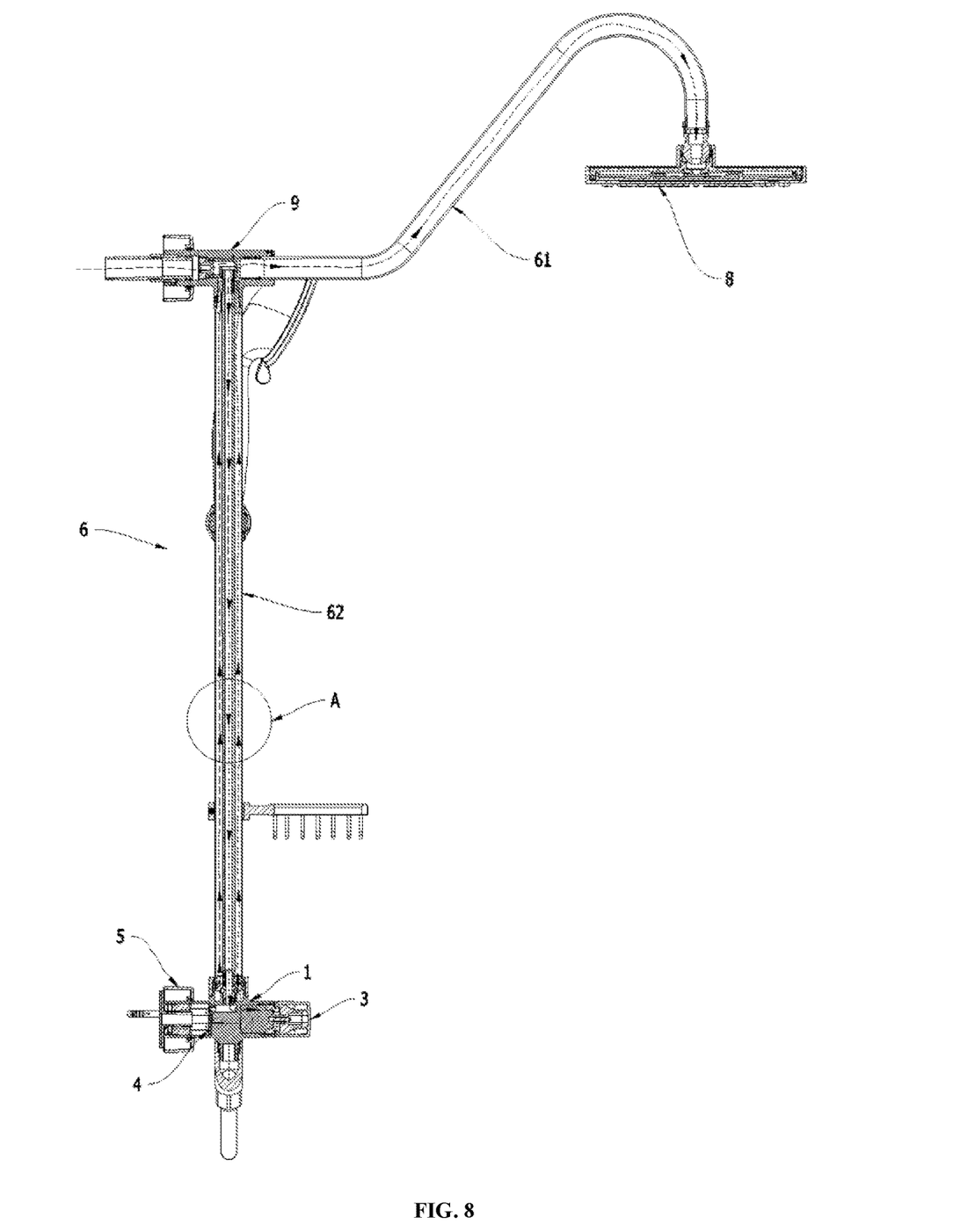
FIG. 8 is a schematic diagram showing a water supply state of an overhead shower according to an embodiment of the present disclosure.
Figure 9:
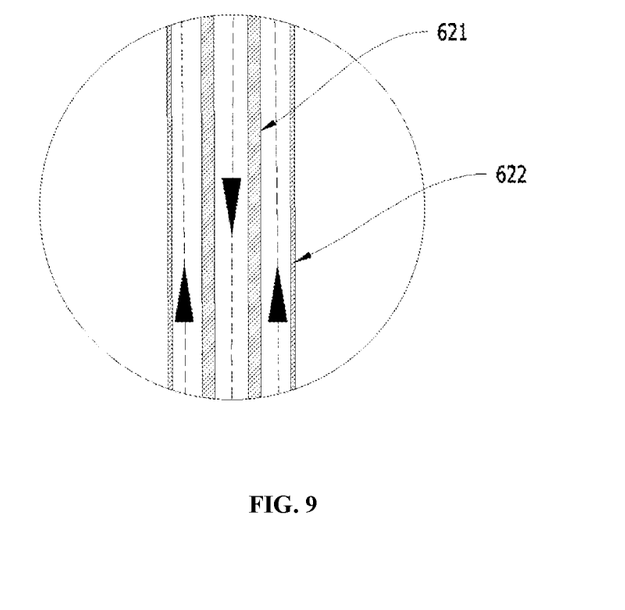
FIG. 9 is a partially enlarged view of part A in FIG. 7.
Figure 10:
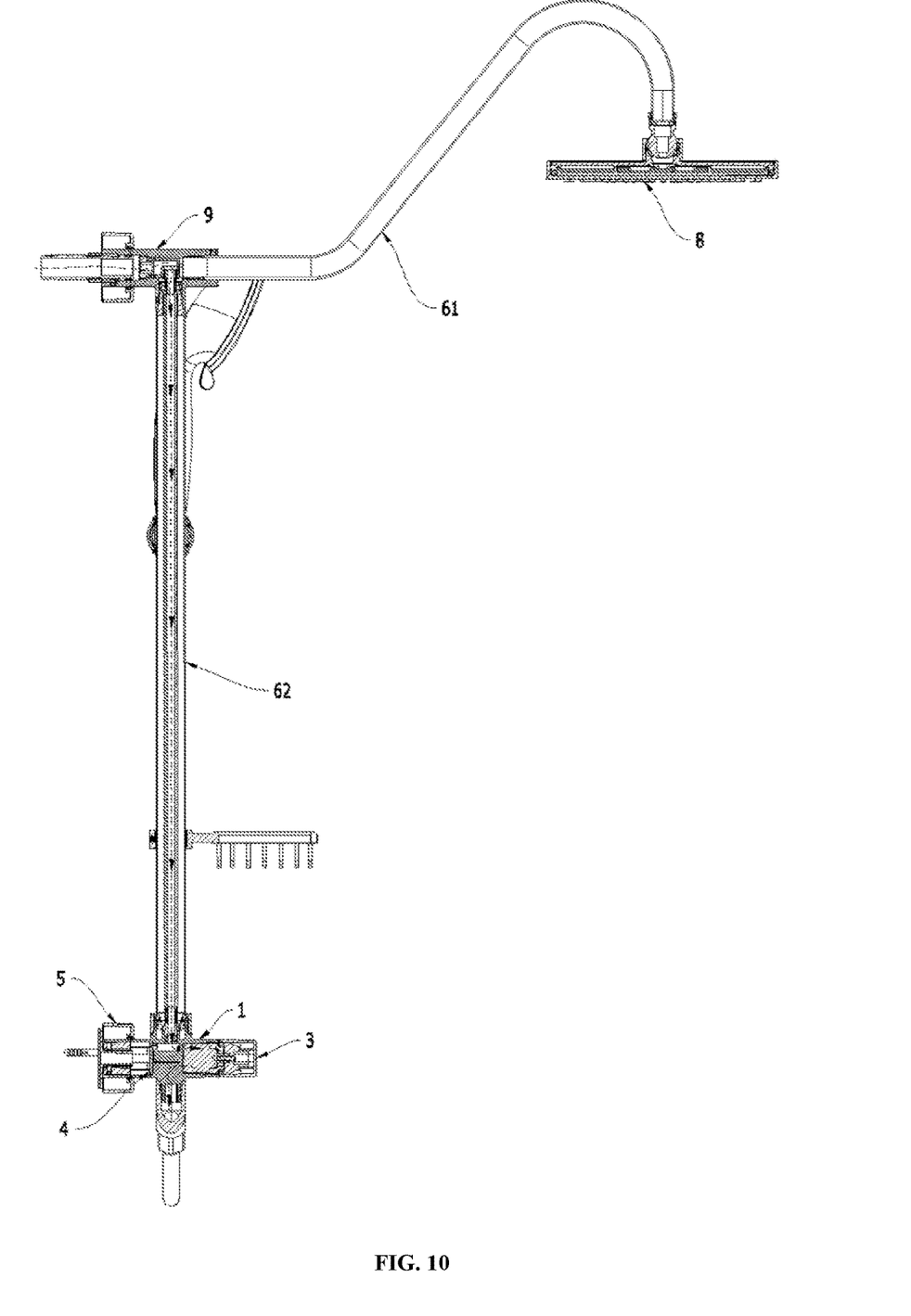
FIG. 10 is a schematic diagram showing a water supply state of a hand shower according to an embodiment of the present disclosure.

Further, as shown in FIGS. 8-10, in the present embodiment, the discharge tube 6 includes a first shower tube 61 and a second shower tube 62. The second shower tube 62 includes an inner tube 621 and an outer tube 622. The inner tube 621 is connected to the first water inlet port 141, the outer tube 622 is connected to the first water outlet port 142. An adapter 9 is connected between the first shower tube 61 and the second shower tube 62, and the adapter 9 is also connected to external water supply pipe to supply water for the discharge tube. The first shower tube 61 is used to connect the adapter 9 and the overhead shower 8. The second shower tube 62 is used to connect the adapter 9 and the first connector 14 of the switching device. In the present embodiment, the second shower tube 62 has a two-layer structure, i.e. an inner tube and an outer tube. The inner tube 621 is a flexible pipe, and the outer tube 622 is a rigid pipe. The first water outlet port 142 is connected to the outer tube 622, and the water independently flows into the first shower tube 61 through the adapter 9, and thus enters the overhead shower 8. In the present embodiment, a soap box and a sliding base are provided on the second shower tube 62, and a soap box and a sliding base are provided on the second shower tube 62. The soap box is used to place toiletries, and the sliding base is used to hold the hand shower 7, which is convenient to use.

Figure 11:
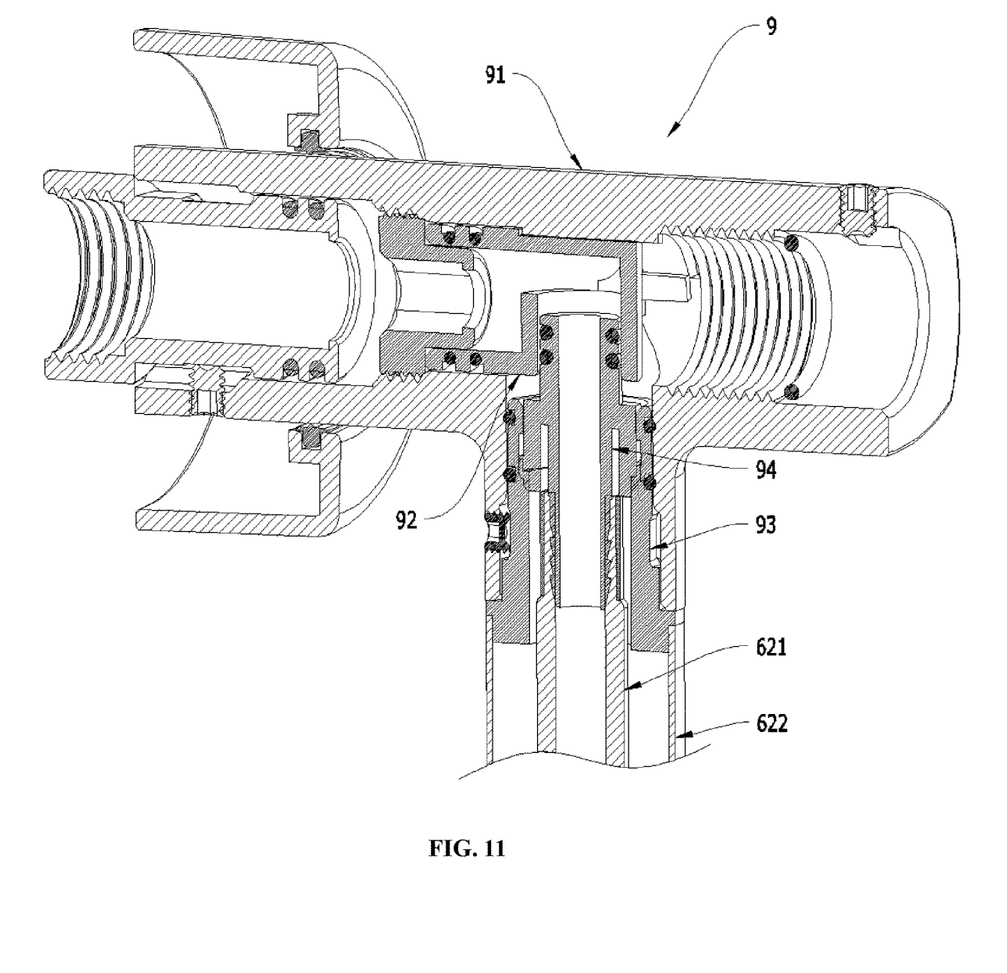
FIG. 11 is a sectional view of an adapter according to an embodiment of the present disclosure.
Figure 12:
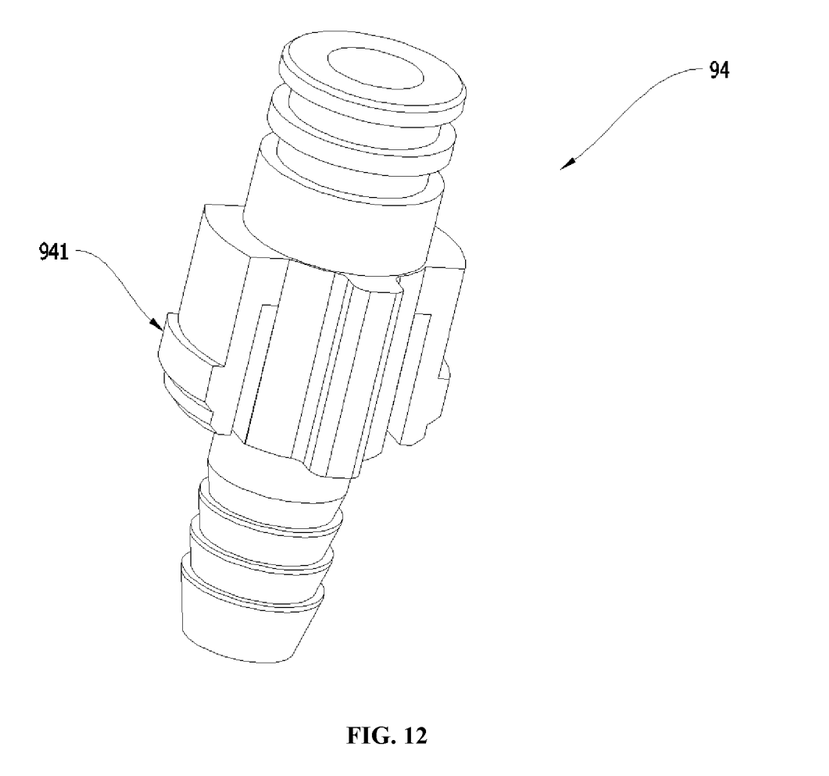
FIG. 12 is a structural schematic diagram of a third inner tube according to an embodiment of the present disclosure.

Further, as shown in FIG. 11, it should be noted that the adapter 9 in the present embodiment includes an adapter shell 91, a first inner tube 92, a second inner tube 93, and a third inner tube 94. The first inner tube 92 and the second inner tube 93 are received inside the adapter shell 91. The adapter shell 91 is a three-way connector, a first port is connected to an external water source, a second port is connected to the hand shower 7, and a third port is connected to the overhead shower 8. The first inner tube 92 is connected inside of the adapter shell 91 in a threaded manner. In other embodiments, the connection type may be a fixed connection, a snap-fit connection, a screw connection, or an abutting connection. The second inner tube 93 is received in the water outlet port at the lower end of the adapter shell 91, and may be connected with the adapter shell 91 through any one of the following manners: a fixed connection, a hinged connection, a pin connection, an abutting connection, and a screw connection, etc. In the present embodiment, the second inner tube 93 is connected to the adapter shell 91 through bolts. A first end of the third inner tube 94 is inserted into the first inner tube 92, and a second end of the third inner tube 94 is inserted into the second inner tube 93. The first end of the third inner tube 94 communicates with the external water inlet port of the adapter shell 91 through the first inner tube 92, and the second end of the third inner tube 94 is connected to the inner tube 621 to supply water for the hand shower 7. As shown in FIG. 12, an outer surface of the third inner tube 94 is provided with a plurality of engaging elements 941 that are engaged with the inner wall of the second inner tube 93. Meanwhile, intervals are provided between adjacent engaging element 941, so that water can flow from the outer tube 622 into the first shower tube 61 through the intervals between adjacent engaging elements 941, then enters the overhead shower 8. In the present embodiment, the adapter 9 defines simple and clear water passages, and the connection of the adapter shell 91, the first inner tube 92, the second inner tube 93, and the third inner tube 94 is simple and easy for assembling.

The above descriptions merely cover the preferred embodiments of the present disclosure which should not be considered as limit to the present disclosure. For those of ordinary skill in the art, the present disclosure may have various modifications and changes. Any modification, equivalent substitution, improvement made by a skilled person without departing from the spirit and principle of the present disclosure fall within the scope of the present disclosure.

What is claimed is:

1. A switching device for shower system comprising:
   a shell main body, wherein the shell main body is internally provided with a partition, the partition is provided with a plurality of water passing holes, and a side of the partition is provided with a plurality of water chambers;
   a valve, wherein the valve is located inside the shell main body, and a first end of the valve abuts on a side of the partition and communicates with the water passing holes;
   a handle kit, wherein the handle kit is connected to a second end of the valve;
   a sealing cover, wherein the sealing cover is configured to block the water chambers at an outer end;
   the water chambers comprise a first chamber, a second chamber, and a third chamber; the first chamber is connected to the first water passing hole, the second chamber is connected to the second water passing hole, and the third chamber is connected to the third water passing hole; and
   the sealing cover is provided with a plurality of protrusions, and the protrusions are received in the water chambers; the protrusions include a first protrusion, a second protrusion, and a third protrusion; the first protrusion, the second protrusion, and the third protrusion are respectively inserted into the first chamber, the second chamber and the third chamber, and are fitted with the inner walls of the first chamber, the second chamber and the third chamber; the first protrusion and the second protrusion are L-shaped and symmetrically arranged, the third protrusion is U-shaped.

2. The switching device for shower system according to claim 1, wherein an upper end of the shell main body is provided with a first connector, a lower end of the shell main body is provided with a second connector, the first connector is provided with a first water inlet port and a first water outlet port.

3. The switching device for shower system according to claim 2, wherein the water passing holes comprise a first water passing hole, a second water passing hole, and a third water passing hole; the first water passing hole is connected to the first water inlet port, the second water passing hole is connected to the first water outlet port, and the third water passing hole is connected to the second connector.

4. The switching device for shower system according to claim 1, wherein the sealing cover is welded to the outer end of the water chambers.

5. A shower system comprising:
   a discharge tube, a hand shower, an overhead shower, and a switching device; wherein the switching device comprises:
   a shell main body, wherein the shell main body is internally provided with a partition, the partition is provided with a plurality of water passing holes, and a side of the partition is provided with a plurality of water chambers;
   a valve, wherein the valve is located inside the shell main body, and a first end of the valve abuts on a side of the partition and communicates with the water passing holes;
   a handle kit, wherein the handle kit is connected to a second end of the valve;
   a sealing cover, wherein the sealing cover is configured to block the water chambers at an outer end;

the water chambers comprise a first chamber, a second chamber, and a third chamber; the first chamber is connected to the first water passing hole, the second chamber is connected to the second water passing hole, and the third chamber is connected to the third water passing hole;

the sealing cover is provided with a plurality of protrusions, and the protrusions are received in the water chambers; the protrusions include a first protrusion, a second protrusion, and a third protrusion; the first protrusion, the second protrusion, and the third protrusion are respectively inserted into the first chamber, the second chamber and the third chamber, and are fitted with the inner walls of the first chamber, the second chamber and the third chamber; the first protrusion and the second protrusion are L-shaped and symmetrically arranged, the third protrusion is U-shaped;

an upper end of the shell main body is provided with a first connector, a lower end of the shell main body is provided with a second connector, the first connector is provided with a first water inlet port and a first water outlet port; and the discharge tube comprises a first shower tube and a second shower tube, the second shower tube comprises an inner tube and an outer tube, the inner tube is connected to the first water inlet port, and the outer tube is connected to the first water outlet port.

6. The shower system according to claim 5, wherein an adapter is connected between the first shower tube and the second shower tube, the adapter comprises an adapter shell, a first inner tube, a second inner tube, and a third inner tube, the first inner tube and the second inner tube are received inside the adapter shell, a first end of the third inner tube is inserted in the first inner tube, and a second end of the third inner tube is inserted in the second inner tube.

* * * * *